INVENTOR.
GERALD DEAKIN
BY
[signature]
AGENT

Aug. 29, 1950 G. DEAKIN 2,520,130

NIGHT SWITCHING FOR PRIVATE AUTOMATIC BRANCH EXCHANGES

Original Filed May 14, 1945 7 Sheets-Sheet 2

INVENTOR.
GERALD DEAKIN
BY
R. J. Berry
AGENT

NOTE 1
* MAKES BEFORE "a" BREAKS
(NL) NON LOCKING
"f" LONG CHANGE OVER
NOTE 2 (10 BUTTON KEY)
(2) MAKES FIRST
(3) OPENS FOR AN INSTANT THEN (5) OPENS.
(4) REVERSES ONLY WHEN ANY KEY (6) TO (0) IS DEPRESSED

INVENTOR.
GERALD DEAKIN
BY
AGENT

Aug. 29, 1950 G. DEAKIN 2,520,130

NIGHT SWITCHING FOR PRIVATE AUTOMATIC BRANCH EXCHANGES

Original Filed May 14, 1945 7 Sheets-Sheet 4

INVENTOR.
GERALD DEAKIN

BY R. J. Perry
AGENT

NIGHT SWITCHING FOR PRIVATE AUTOMATIC BRANCH EXCHANGES

Original Filed May 14, 1945 7 Sheets-Sheet 5

INVENTOR.
GERALD DEAKIN
BY [signature]
AGENT

NIGHT SWITCHING FOR PRIVATE AUTOMATIC BRANCH EXCHANGES

Original Filed May 14, 1945 7 Sheets-Sheet 6

INVENTOR.
GERALD DEAKIN
BY [signature]
AGENT

Aug. 29, 1950 G. DEAKIN 2,520,130

NIGHT SWITCHING FOR PRIVATE AUTOMATIC BRANCH EXCHANGES

Original Filed May 14, 1945 7 Sheets-Sheet 7

NOTE:
※ MAKES BEFORE "a" BREAKS AND BEFORE "f" MAKES

INVENTOR.
GERALD DEAKIN
BY [signature]
AGENT

Patented Aug. 29, 1950

2,520,130

UNITED STATES PATENT OFFICE 2,520,130

NIGHT SWITCHING FOR PRIVATE AUTOMATIC BRANCH EXCHANGES

Gerald Deakin, New York, N. Y., assignor to International Standard Electric Corporation, New York, N. Y., a corporation of Delaware Original application May 14, 1945, Serial No. 593,602. Divided and this application May 21, 1945, Serial No. 594,872

8 Claims. (Cl. 179—27)

This invention relates to new and useful improvements in automatic telephone systems, and more particularly to improvements applicable to small telephone exchanges.

The object of the present invention is to provide for so-called "night switching" service whereby calls coming into an exchange when the customary attendant is absent may be routed direct to one of the subscribers' stations.

The present is a division of my copending application, Serial No. 593,602, filed May 14, 1945.

The various features of the invention will more readily appear from the following description of an embodiment thereof as applied to the drawings, in which:

Figs. 1, 2 and 3 illustrate diagrammatically an inter-exchange trunk and the attendant's position;

Figs. 4, 4*a*, and 4*b* illustrate a local link and the line finder and the selector by which it may be extended to an inter-exchange trunk or a called station;

Only so much is disclosed herein as is necessary for an understanding of the invention.

During the night or hours of light traffic when the attendant's position is shut down, all or a portion of the P. A. B. X trunks may be converted to automatic in-trunk switching to a predetermined P. A. B. X station by throwing the night switching key which forms part of each trunk. For this direct switching service individual numbers are assigned to the trunks and listed in the telephone directory as night numbers. The lamps on the attendant's switchboard operate substantially as usual so that all calls may, when desired, be supervised. No lamp remains burning when the calling city party hangs up and frees the trunk.

When a trunk converted for night switching is selected at the central office, it is automatically picked up at the P. A. B. X by a special night switching link (Fig. 5) which, without using the P. A. B. X register, controls the selectors automatically to extend the trunk call to the P. A. B. X station assigned to night service.

The city call is not metered until the P. A. B. X station answers. If the trunk is busy at the central office, the city subscriber receives the usual busy tone but if the trunk is free, the city subscriber receives the usual ringing tone. This ringing tone will continue until the P. A. B. X station answers or until the calling station hangs up. If the P. A. B. X station is busy, the city subscriber will receive the busy tone from the P. A. B. X.

In case of a trunk call made via the P. A. B. X attendant, the meter operates when the attendant answers, even though the wanted station subsequently may be found busy.

This automatic in-switching facility may, of course, be used during normal traffic hours when desired. When trunks are so used, the calling lamp caps may be given special colors or the trunks otherwise identified so that the attendants may know that such calls will be extended automatically.

The P. A. B. X stations assigned for automatic selection may be called over other trunks through the attendant's position in the usual way. Such stations may make local, outgoing trunk, information, transfer and flash-in calls in the usual way. In other words, assigning a station to a trunk does not restrict its customary use. Assigned as well as unassigned P. A. B. X stations may pick up any trunk when making out-trunk calls. When, therefore, the night keys are thrown, all the trunks remain available to all the stations for out-trunking.

The B-link finders of the night switching links (Fig. 5) are like those provided for the R-links. Their terminal banks have a capacity for 120 B-links. The number of night switching links required depends upon the number of automatic switching calls to be handled simultaneously. Usually two or three NS-links will be sufficient for a large P. A. B. X.

Referring now to the specific means for performing the above-described functions:

*Night switching key NSK thrown*

Figure 1:
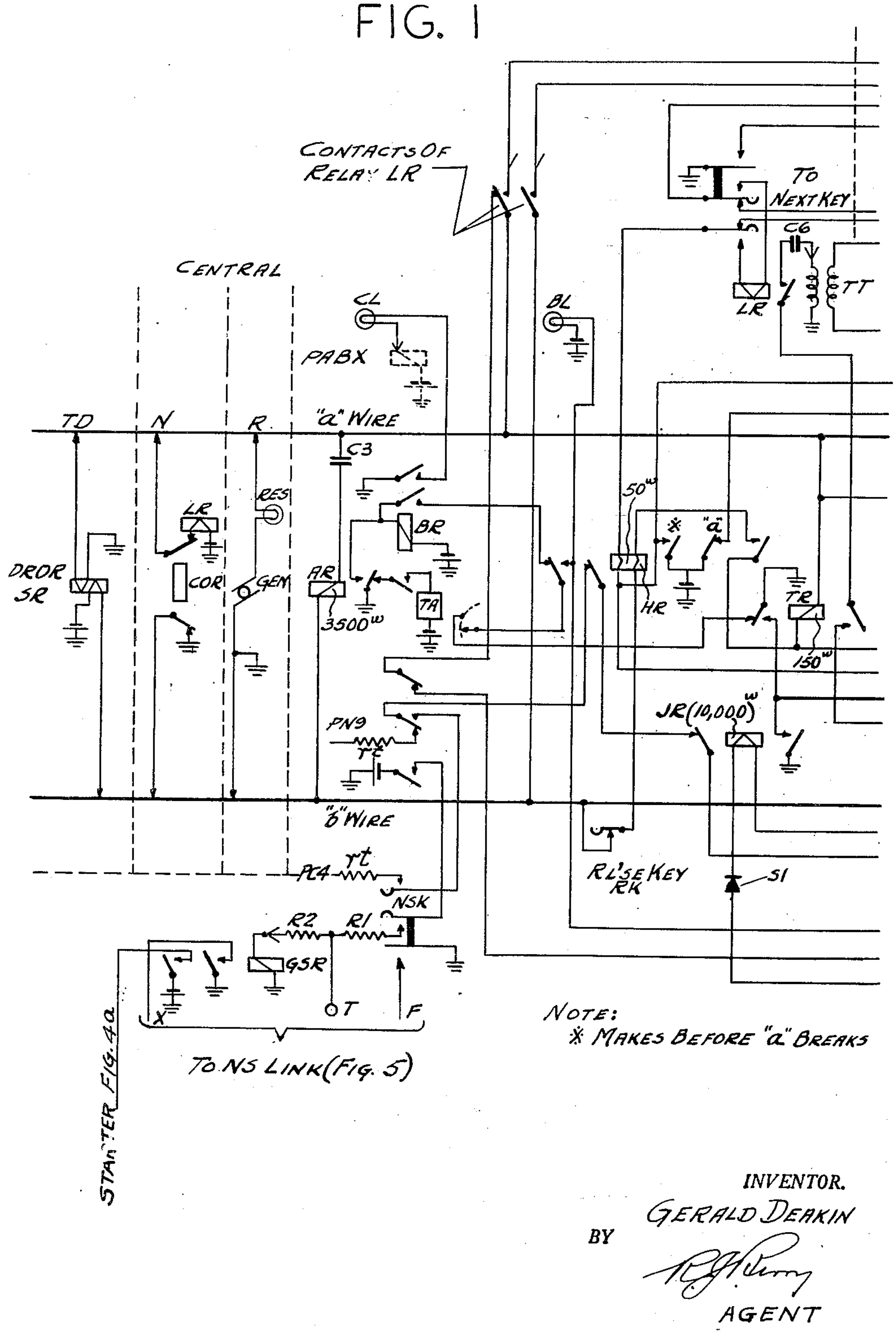
Figure 5:
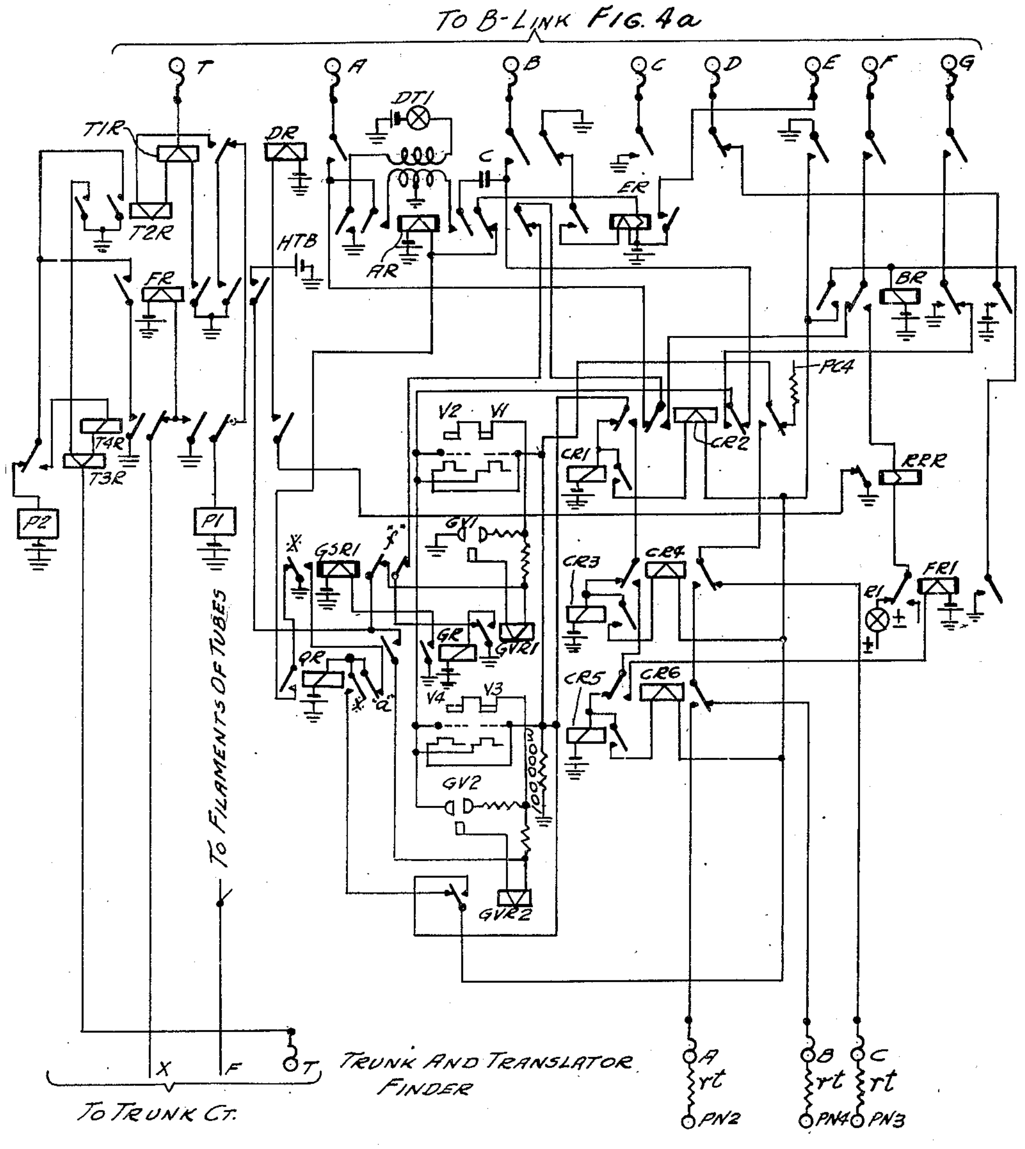
Fig. 5 illustrates the night switching link.

To convert a trunk for automatic in-switching service, it is only necessary to throw the night switching key NSK (Fig. 1). When this key is thrown, ground is placed upon the filaments of the tubes V1—V4 in the night switching circuit (Fig. 5). These triodes and their associated gas valves GV1, GV2 and relays function in the same manner as the corresponding equipment described in connection with the register. The tubes burn only when a night switching key is thrown.

The night switching key has one contact to place a distinctive calling potential PC4 on a front contact of BR (Fig. 1). Over a second contact the key conects terminals T of the B-link finder banks of the night switching links (Fig. 5) to another front contact of BR (Fig. 1).

To the same T-terminal is connected through resistor R2 a starting relay GSR which is common to all trunks appearing in a given quadrant of the link finder banks. Should the trunks be distributed over all quadrants, there would be four GSR relays.

*Trunk selected at central office*

Figure 2:
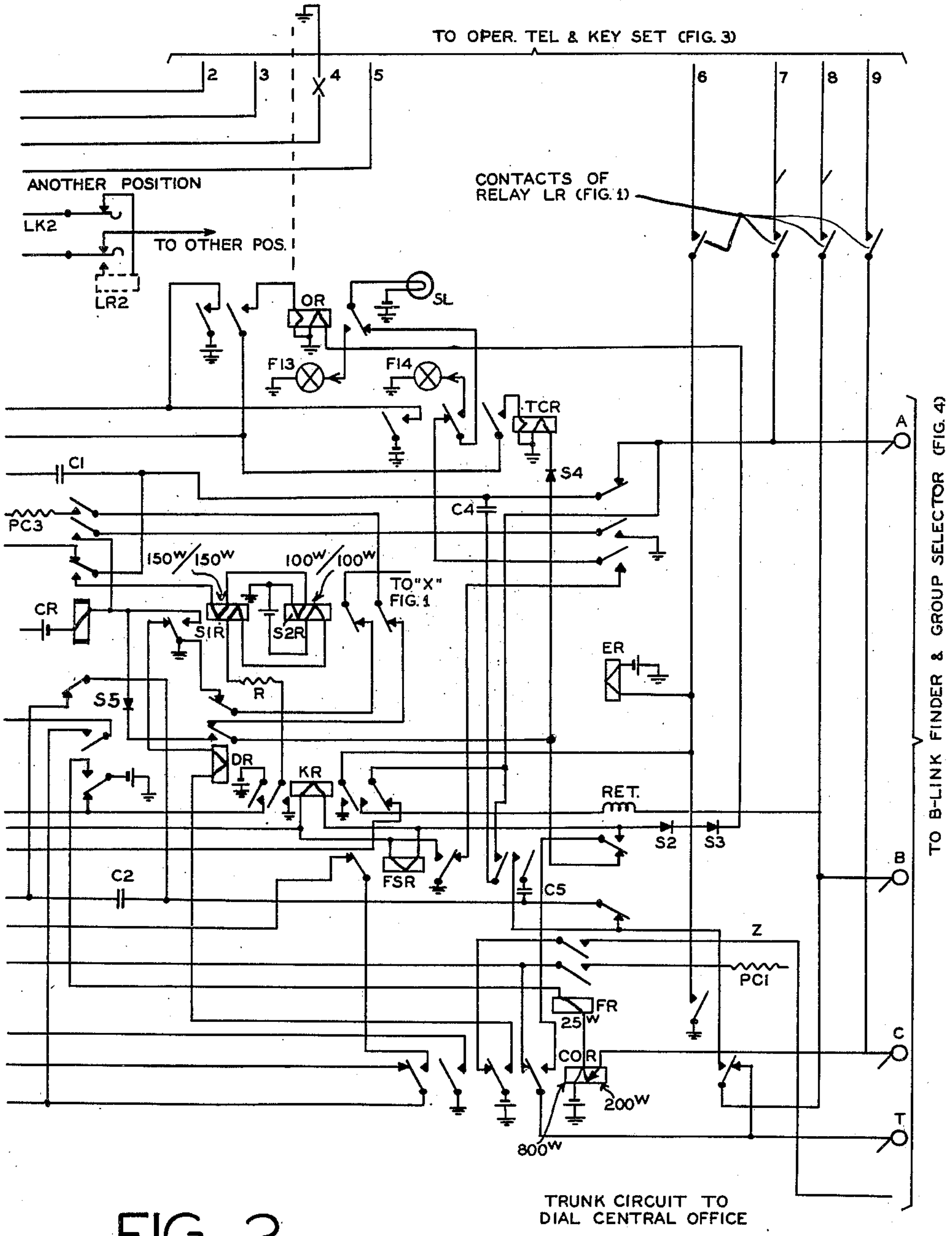
Figure 3:
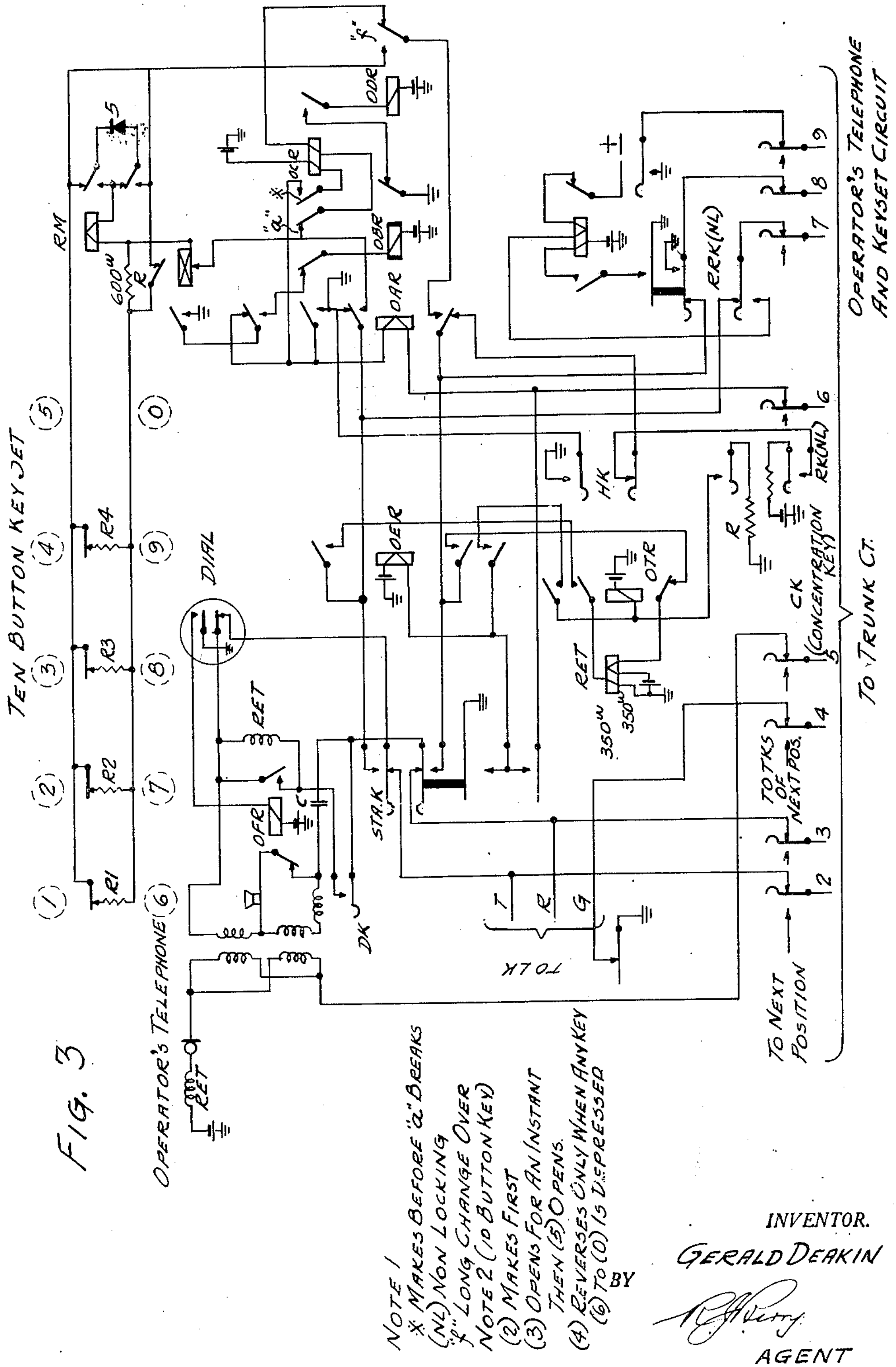

When a trunk is selected at the central office, ringing current is applied to it in the usual way and AR (Fig. 1) operates to energize BR. BR locks up over a back contact of HR, and the contact of TA. BR places calling potential PC4 on the T-terminal (Fig. 2) of the trunk. This will insure the selection of the trunk only by the line finder of a B-link connected with an NS-link, since PC4 is normally connected over CR2 back (Fig. 5) to the grids of V1 and V3.

Figures 4, 6:
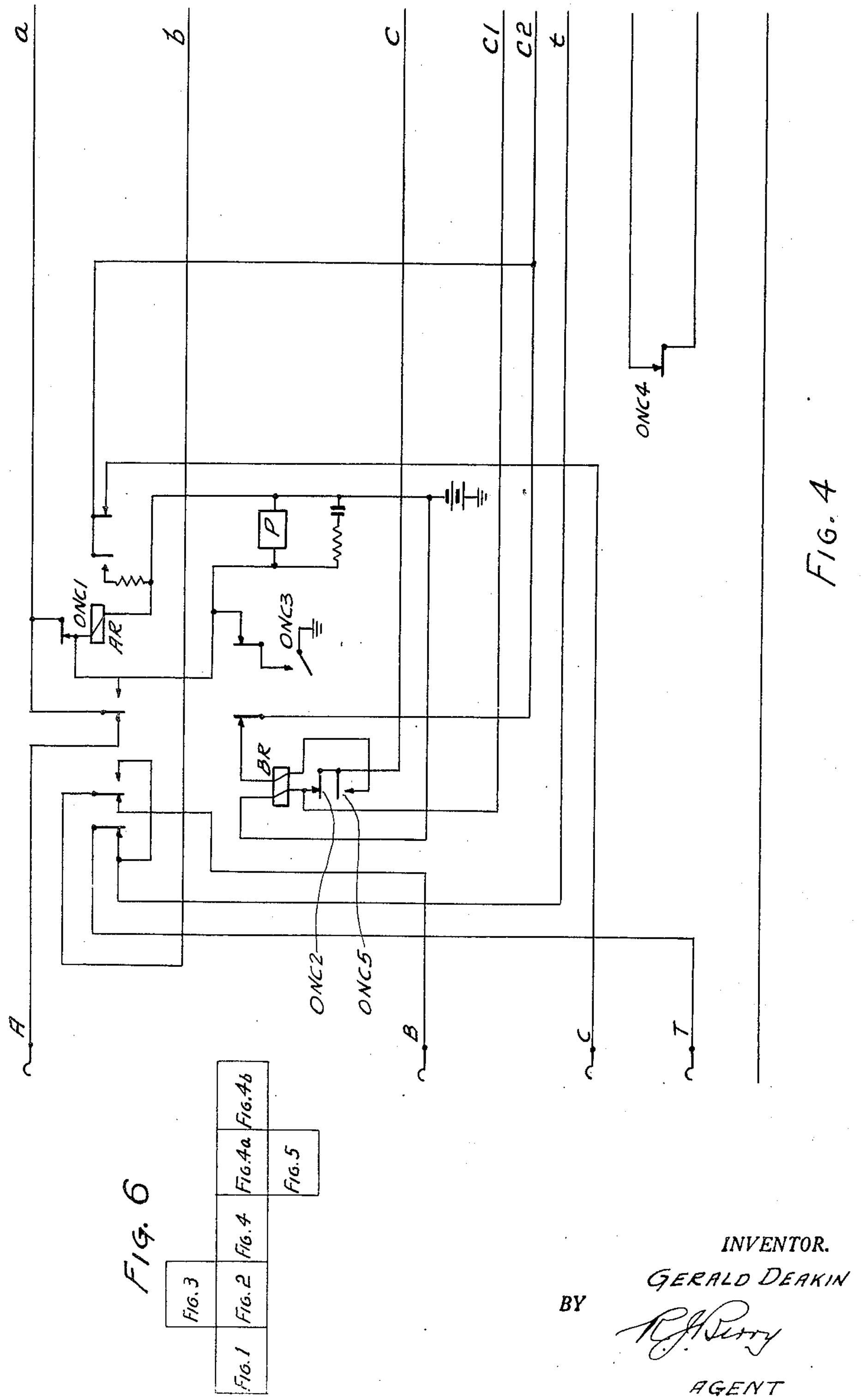
Fig. 6 illustrates the manner in which the drawings should be combined.
Figure 4A:
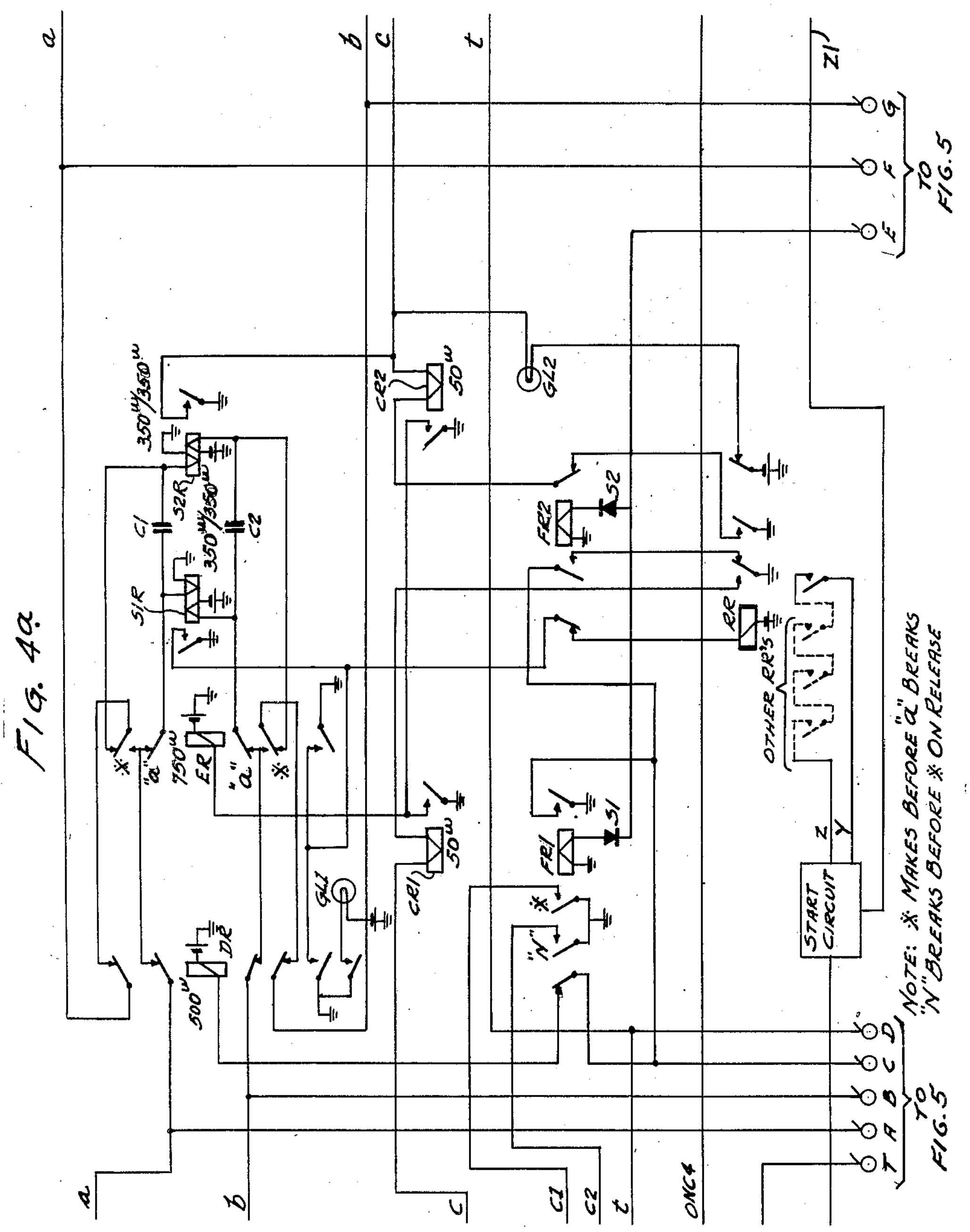

BR also places battery on terminal T of the NS-link (Fig. 5) through resistor R1 and energizes through resistor R2, GSR (Fig. 1). GSR places battery on the common starting lead Z1 to the starting circuit (Fig. 4a), thus making it possible for the NS-link (Fig. 5) to select a first choice B-link (Fig. 4a).

*NS-link picks up B-link*

GSR (Fig. 1) places ground on common lead X to all the NS-links (Fig. 5) and energizes FR in each link over a back contact of T4R. FR energizes the associated B-link finder magnet P1 over back contacts of T1R and T4R and at the same time places ground on the high resistance winding of T1R.

The NS-links hunt for an idle B-link in the same manner as R-links hunt for an idle B-link on a regular call.

When a B-link is picked up, T1R operates and shunts its high resistance winding by its low resistance winding in series with T2R, thus making the selected B-link busy.

*NS-link picks up trunk*

T2R (Fig. 5) closes the circuit of the trunk and translator finder magnet P2 and places ground on the high resistance winding of T3R. The trunk and translator finder is like the customary register finder. However, its wiper T hunts for the city trunk, and its wipers A, B, C for potentials connected in combinations determined by the number of the station to which such calls are channelled.

When wiper T reaches the calling trunk T3R operates over a circuit from ground, front T2R, high resistance winding T3R, brush T, resistor R1 (Fig. 1) of the trunk, NSK, front BR to battery. T3R (Fig. 5) operates, energizes T4R, disconnects P2 and makes the selected trunk busy.

The low resistance test circuit thus established shunts out GSR (Fig. 1) which releases and causes any other hunting NS-links to come to rest. GSR also removes battery from the Z1-lead to the starting circuit.

T4R (Fig. 5) disconnects the X-lead running from GSR (Fig. 1) to FR (Fig. 5) but before doing so, closes a circuit for FR to ground and over another front contact. T3R closes a holding and busying test circuit through T3R and T4R. T4R opens the circuit of P1, thus preventing its re-energization when T1R and T2R fall off.

*B-link selects trunk*

T4R energizes DR over a back contact of RRR, thus closing the fundamental selection control circuit from the "*a*" wire of the B-link (Fig. 4*a*), brush A of the B-link finder, front DR, back CR2, back AR, back GSR1, back GVR1 to ground. The circuit of the "*b*" wire is closed from the B-terminal, front DR, back CR2 to the grids of triodes V2 and V4.

The line finder in which the B-link terminates hunts for the city trunk in substantially the same manner as any other B-link under the control of a register hunts on a regular call for a calling line. The only difference is that the line finder of the B-link is now hunting for the potential PC4 placed on the T-terminal of the trunk over key NSK (Fig. 1) and a front contact of BR. Since the grids of V1 (Fig. 5) and V3 are connected to the same PC4 potential over a back contact of CR2, when the calling trunk is found, GV1 fires in the usual manner and energizes GVR1 which removes ground from the "*a*" wire and causes the line finder to come to rest on the city trunk.

*Second test at line finder*

GVR1 energizes GR, GR energizes GSR1 and places high tension battery on the second group of electronic discharge devices including GV2, V3 and V4.

GSR1 energizes QR which locks up over a back contact of GVR2 and front DR. When high tension battery is placed on V3 and V4, a second test is made in the same manner as in the register from the grid of V4, over CR2 back, DR front, the *b* wire, the B-terminal of the trunk (Fig. 2), back contacts of COR, JR (Fig. 1) and HR, BR front, NSK to PC4. GV2 fires and energizes GVR2.

GVR2 releases QR and over a front contact energizes CR1.

GSR1 opens the high tension battery to GV1 which GV1 de-ionizes and releases GVR1, releasing GR and, in turn, GSR1. As GSR1 is somewhat slow releasing, it maintains open the fundamental circuit so that ground is not again immediately placed on the "*a*" wire. When GR breaks its front contact it de-ionizes GV2, releasing GVR2 which removes the short-circuit from CR2. CR1 locks up in series with CR2, circuit from ground, front DR, winding CR2, front CR1, winding CR1 to battery.

*Group selector selects final*

We shall assume that the station assigned to answer calls on the trunk has the number 342.

When CR2 makes its front contact, it grounds the "*a*" wire of the first group selector (Fig. 4*a*) over brush F (Fig. 5) front DR, back BR, front CR2, back AR, back GSR1, back GVR1 to ground.

Potential PN3 corresponding to the first digit of the wanted number is placed on the grids of V1 and V3 over a resistance *rt*, terminal and brush C of the trunk and translator finder, back CR4, front CR2 to grids V1 and V3.

Figure 4B:
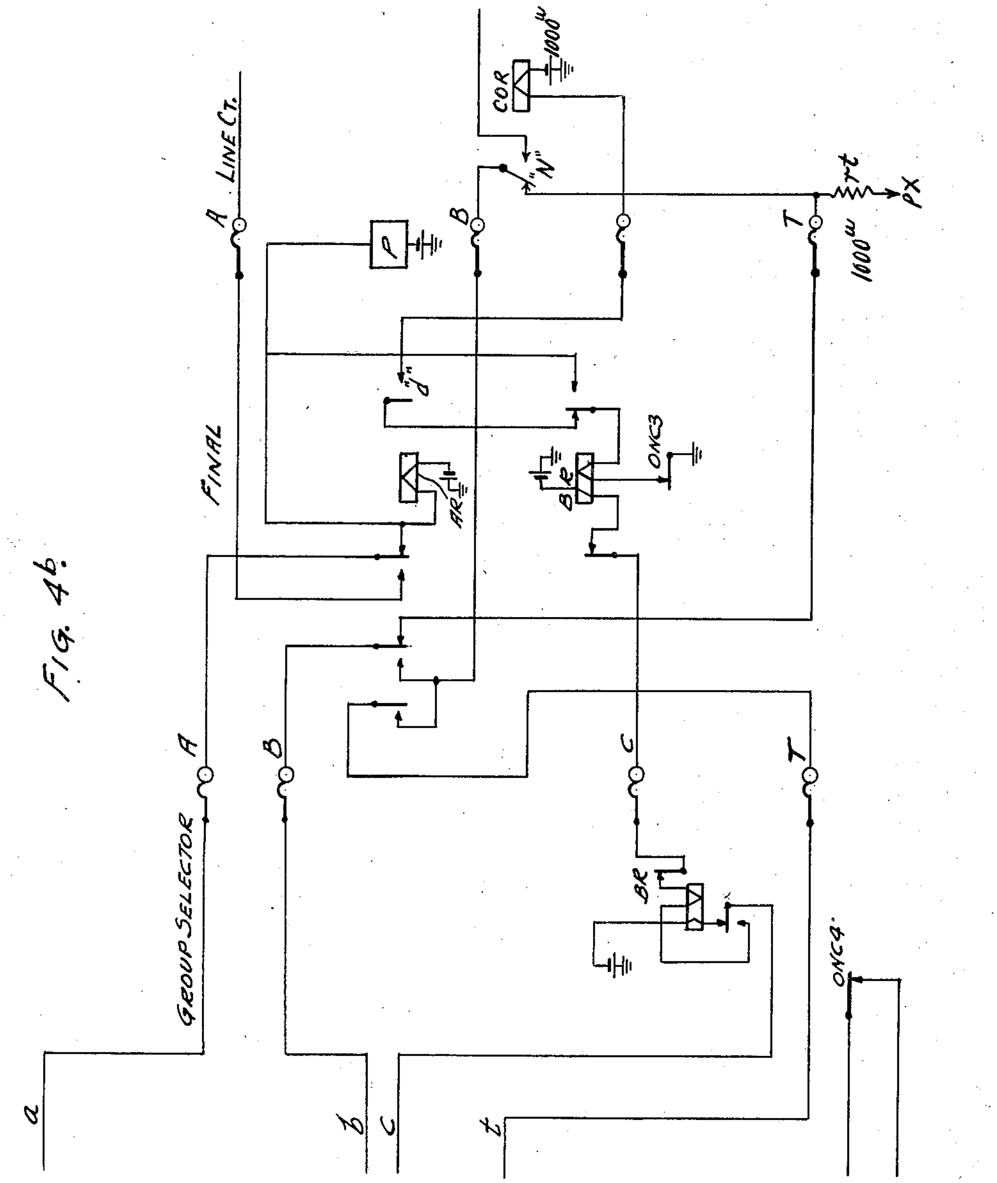

The group selector selects an idle final (Fig. 4*b*) in the usual way after which a second test is made, again in the usual way and when successful GVR2 operates for the second time and energizes CR3 over a front contact of CR2.

*Final selects "tens"*

When GVR2 falls away for the second time, CR4 locks up in series with CR3 and the fundamental circuit is again closed. This time potential PN4, corresponding to the second digit, is placed on the grids of V1 and V3 over brush B of the trunk and translator finder, back CR6, front CR4 and front CR2. The "tens" is selected in the usual way after which the usual second test is made.

*Final selects units*

When GVR2 operates for the third time, CR5 operates and when it releases CR5 locks up in series with CR6 and the fundamental circuit is closed for the third and last time. Potential PN2, corresponding to the last digit of the number, is placed on the grids of V1 and V3 over wiper A of the translator finder, and front contacts CR6, CR4 and CR2. When the called line is reached GVR1 operates and the final comes to rest on the terminals of the assigned station.

*Called station free*

If the called station is free, GVR2 operates for the fourth time and energizes FR1, circuit from ground, front DR, front GVR2, front CR2, front CR4, front CR6, winding FR1 to battery. FR1 energizes BR which locks up to ground over a front contact of DR. BR connects the "a" wire of the called line over brush F to ringing current source through RRR, and over the G-brush, the "b" wire of the line to ground. FR1 supplies over a front contact an immediate ring.

When GVR2 breaks its front contact and FR1 makes its back contact, ringing current is supplied over the usual ringing interrupter R1. The city subscriber receives the central office ringing tone.

*Called station answers*

When the station answers, marginal ringing relay RRR (Fig. 5) breaks its back contact and releases DR which disconnects the ringing current from the called line.

DR also releases BR but as BR is slightly slow releasing, a momentary circuit is established from negative battery, front BR, back DR, brush D and the B-link (Fig. 4a), thence to the T-terminal of the trunk (Fig. 2), front COR, back ER, front DR, rectifier S5, winding CR to ground.

*Trunk connected through to the called station*

CR (Fig. 2) energizes and bridges the low resistance high impedance relay TR (Fig. 1) across the trunk, thereby tripping the ringing relay (not shown) at the central office and completing the call at that end.

TR removes ground from the holding circuit of BR (Fig. 1). BR releases and removes battery from the T-brush of the trunk and translator finder (Fig. 5), thus releasing relays T3R and T4R which release FR. The night switching link is now entirely freed.

CR (Fig. 2) bridges the supervisory relays S1R and S2R across the A and B terminals of the trunk. At the same time CR effectively short-circuits the high resistance winding of COR, thereby causing CR1 (Fig. 4a) of the B-link to operate and energize ER, which removes the local transmission bridge from the B-link. The answering station now receives transmitter current from the bridge in the trunk circuit over a clean pair of wires through the B-link and final.

*Release*

The release of the trunk is accomplished in the same manner as on trunk calls established via the attendant.

*Called station busy*

Should the called station be busy, GVR2 (Fig. 5) will not operate. Therefore, when GSR1 makes its back contact, a circuit will be established from ground, back GSR1, front QR, winding AR to battery and in multiple over a back contact of AR, winding ER to battery. ER is disconnected by AR but operates long enough to place negative battery on brush E, thereby momentarily operating FR2 (Fig. 4a) of the B-link which releases the final and group selector as on a normal busy call.

AR (Fig. 5) bridges the primary winding of busy tone transformer TT, the center point of which is grounded, across the "a" and "b" wires of the trunk to the central office.

Condenser C prevents the flow of current to the "b" wire but ground on the "a" wire trips the ringing relay at the central office (Fig. 1) and thereby connects the calling city subscriber to the trunk. The calling subscriber hears the busy tone but the meter is not operated since the "b" wire is not grounded.

*Release*

Ordinarily the calling subscriber hangs up promptly when he hears the busy tone. However, should he not hang up promptly, the busy tone will cease within a maximum of five seconds since removal of ringing current from the trunk de-energizes AR (Fig. 1), thus permanently closing the circuit of TA over the front contact of BR. In five seconds or so, TA opens the locking circuit of BR. BR releases, disconnects TA and removes battery from the T-terminal of the trunk and translator finder which releases T3R (Fig. 5), T4R and FR.

T4R releases DR. DR opens the locking circuit of QR and this in turn de-energizes slow releasing relay AR. However, before AR releases, DR applies ground over its back contact and a front contact of AR to energize slow releasing relay ER. ER places battery on the E-brush of the B-link and again energizes FR2 (Fig. 4a). Since both AR (Fig. 5) and ER are slow releasing, the circuit of FR2 (Fig. 4a) is held closed long enough to allow RR to de-energize and break its front contact to release the B-link.

The B-link and the NS-link are now restored to normal.

Should the calling subscriber fail to hang up after the busy tone ceases, the trunk is held busy at the central office by the final and at the P. A. B. X by energization of the high resistance relay JR (Fig. 1) which opens the "t" wire circuit, thus preventing the trunk from being picked up by a B-link at the P. A. B. X. The energizing circuit of JR may be traced from ground, one winding of DR or SR of the central office (Fig. 1), "a" wire, back LR, back BR, back COR (Fig. 2), rectifier S1, (Fig. 1), winding JR, "b" wire, other winding of DR or SR to battery. When the calling subscriber finally hangs up, the condition at the central office changes from that indicated at TD (Fig. 1) to that indicated at N. With this reversal of polarity, no current flows through rectifier S1 and JR releases.

What I claim is:

1. In a telephone system, an exchange having a plurality of stations and outside trunks, an attendant's position, a plurality of automatic switches, means controlled by the attendant for answering an incoming trunk call and for operating said switches to connect the calling trunk with a called station, a night switching key for each trunk, a night switching link circuit means operable when the night switching key associated with a trunk is operated and responsive to a call incoming thereon for operating said night switching link circuit to find the calling trunk, and means controlled by said night switching link circuit for causing certain of the automatic switches to extend the trunk to a predetermined station.

2. In a telephone system, the combination as defined in claim 1, in which the exchange includes local link circuits and the means for causing certain of the automatic switches to extend the trunk to a predetermined station comprises one of the local link circuits, means for causing the night switching link circuit to seize said local link circuit, and means for causing said local link circuit to seize said trunk.

3. In a telephone system, the combination as defined in claim 2, in which the automatic switches are both numerical and non-numerical and in which the night switching-link circuit is provided with numerical switch control equipment which controls the numerical switches in the local link circuit for connecting the trunk to the predetermined station.

4. In a telephone system, the combination according to claim 3, in which means is provided in the night switching link for successively connecting the numerical control equipment to successive stages of selectors.

5. In a telephone system, the combination according to claim 3, in which the numerical control equipment of the night switching link circuit is preset to control predetermined selecting operations to reach a certain station over the selectors.

6. In a telephone system, the combination according to claim 3, in which a plurality of different sources of potentials are connected with the night switching link circuit, means in each selector for connecting the different potentials with the night switching link circuit, the numerical control equipment in the night switching link circuit comprising means for starting said selectors one after the other and for stopping each selector when the potential connected by it bears a predetermined relationship to a certain one of said potentials.

7. In a telephone system, a private branch exchange having a plurality of stations and outside trunks, an attendant's position, automatic non-numerical and numerical switches at the private branch exchange, means including at least a numerical switch controlled by the attendant for connecting a calling trunk with the desired called station, a night switching key for each trunk, a night switching link circuit means operable when the night switching key associated with a trunk is operated and responsive to a call incoming thereon for operating said night switching link circuit to find the calling trunk, and means controlled by said night switching link circuit for causing a non-numerical and at least one numerical switch to extend the trunk towards a predetermined station.

8. In a telephone system, a private branch exchange having a plurality of stations and outside trunks, an attendant's position, automatic selector and line finder switches at the private branch exchange, means controlled by the attendant for answering an incoming trunk call and for operating a line finder to connect the calling trunk with a selector and the selector for extending the call towards the called station, a night switching key for each trunk, a night switching link circuit, a line finder connected thereto, means operable when the night switching key associated with a trunk is operated and responsive to a call incoming thereon for causing said night switching link circuit to find the calling trunk, and means controlled by said night switching link circuit for causing a line finder to select the calling trunk and a selector to extend the calling trunk via the last mentioned line finder towards a predetermined station.

GERALD DEAKIN.

REFERENCES CITED

The following references are of record in the file of this patent:

UNITED STATES PATENTS

| Number | Name | Date |
|---|---|---|
| 1,668,541 | Schwartz | May 1, 1928 |
| 1,693,599 | Gillings | Dec. 4, 1928 |
| 2,214,914 | Voss | Sept. 17, 1940 |
| 2,335,481 | Boswau | Nov. 30, 1943 |
| 2,380,950 | Deakin | Aug. 7, 1945 |